US011293729B2

(12) United States Patent
Swenson

(10) Patent No.: US 11,293,729 B2
(45) Date of Patent: Apr. 5, 2022

(54) RUDDER CONTROL ASSEMBLY FOR A MISSILE

(71) Applicant: SAAB AB, Linköping (SE)

(72) Inventor: Anders Swenson, Linköping (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 17/426,483

(22) PCT Filed: Jan. 31, 2019

(86) PCT No.: PCT/SE2019/050084
§ 371 (c)(1),
(2) Date: Jul. 28, 2021

(87) PCT Pub. No.: WO2020/159412
PCT Pub. Date: Aug. 6, 2020

(65) Prior Publication Data
US 2022/0042776 A1    Feb. 10, 2022

(51) Int. Cl.
F42B 10/64    (2006.01)
B64C 9/00     (2006.01)
G05D 1/10     (2006.01)

(52) U.S. Cl.
CPC ............... F42B 10/64 (2013.01); B64C 9/00 (2013.01); G05D 1/107 (2013.01)

(58) Field of Classification Search
CPC . F42B 10/64; F42B 10/62; B64C 9/00; G05D 1/107
See application file for complete search history.

(56) References Cited

U.S. PATENT DOCUMENTS 5,406,879 A * 4/1995 Willacy ............... F15B 15/261
                                                       92/24
8,975,566 B2 * 3/2015 Black .................... F42B 10/64
                                                      244/3.24
(Continued)

FOREIGN PATENT DOCUMENTS

EP    0601794 A1    6/1994

OTHER PUBLICATIONS

International Searching Authority, International Search Report and Written Opinion received for International Application No. PCT/SE2019/050084, dated Oct. 2, 2019, 11 pages, Swedish Patent and Registration Office, Sweden.

Primary Examiner — Rodney A Bonnette
(74) Attorney, Agent, or Firm — Alston & Bird LLP

(57) ABSTRACT

The invention relates to a rudder control assembly (2) for a missile (1), the rudder control assembly (2) comprising: a first actuator (20) connectable to a rudder (16), which first actuator (20) is configured to steer the rudder (16) when connected to the rudder (16); a coupling element (22) for connecting the first actuator (20) to the rudder (16); and a second actuator (24) for locking the rudder (16) in a fixed position, wherein the second actuator (24) comprises a locking element (26), which is configured to lock and unlock the rudder (16) and which locking element (26) also is configured to connect the first actuator (20) with the rudder (16) by means of the coupling element (22) when unlocking the rudder (16). The invention also relates to a missile (1), comprising a rudder control assembly (2). The invention also relates to a method, performed by a control device (100), for testing a first actuator (20) of a rudder control assembly (2) for a missile (1). The invention also relates to a computer program (P) and to a computer-readable medium.

15 Claims, 7 Drawing Sheets

(56) References Cited

U.S. PATENT DOCUMENTS

| | | |
|---|---|---|
| 2007/0007383 A1 | 1/2007 | Hsu et al. |
| 2011/0255968 A1* | 10/2011 | Recksiek .......... B64D 45/0005 416/23 |
| 2012/0111993 A1 | 5/2012 | DeHart |
| 2014/0021289 A1 | 1/2014 | Bugge et al. |
| 2014/0042266 A1 | 2/2014 | Black et al. |

* cited by examiner

US 11,293,729 B2

RUDDER CONTROL ASSEMBLY FOR A MISSILE

CROSS REFERENCE TO RELATED APPLICATIONS

This application is a National Stage Application, filed under 35 U.S.C. § 371, of International Application No. PCT/SE2019/050084, filed Jan. 31, 2019; the contents of which as are hereby incorporated by reference in their entirety.

BACKGROUND

Related Field

The invention relates to a rudder control assembly for a missile according to the appended claims. The invention further relates to a missile, comprising such a rudder control assembly according to the appended claims. The invention further relates to a method, performed by a control device, for testing a first actuator of a rudder control assembly for a missile, according to the appended claims. The invention further relates to a computer program and a computer-readable medium according to the appended claims.

Related Art

Missiles comprises control surfaces to control the flight direction. The control surfaces are arranged on rudders, which are attached to movable shafts, which extend from the body of the missile. The rudders may comprise of movable fins and thus the fins constitute the control surfaces. Alternatively, a rudder may be hinged to a fixed fin of the missile body. The rudders move in various directions in response to a movement of the movable shafts.

Rudder control assemblies for missiles comprises devices for locking the rudders in place prior to missile launch. Such locking devices hold the rudders in rigid and stable positions in order to prevent wear and tear on the control assemblies responsible for operating the rudders. A missile positioned on the exterior of an aircraft, the rudders of the missile are subjected to high aerodynamic loading prior to launch. The locking devices of the rudder control assembly, prevents distortion and fatigue failures of the drive systems of the rudders, such as actuators and shafts.

The document US 2007007383 A1 discloses a fin control assembly comprising an arm, which is configured to be coupled to a fin and steer the fin relative to a housing. A locking member is configured to move from an engaged position to a disengaged position relative to the arm. The locking member locks the arm in a substantially fixed state to inhibit movement of the arm relative to the housing when the locking member is in the engaged position. The locking member unlocks the arm from the substantially fixed state to allow the arm to steer the fin relative to the housing when the locking member moves from the engaged position to the disengaged position. The fin control assembly may comprise an assembly test procedure in which a relatively small force is applied to a control piston to move the locking member out of engagement with the arm.

BRIEF SUMMARY

Despite known solutions in the art, it is desired to achieve a rudder control assembly for a missile, which rudder control assembly is functional and reliable.

Also, it is desired to achieve a rudder control assembly for a missile, which rudder control assembly indicates that steering of a rudder does not work.

An object of the invention is therefore to achieve a rudder control assembly for a missile, which rudder control assembly is functional and reliable.

A further object of the invention is to achieve a rudder control assembly for a missile, which rudder control assembly indicates that steering of a rudder does not work.

The herein mentioned objects are achieved with a rudder control assembly for a missile according to the appended claims. The herein mentioned objects are also achieved with a missile, comprising such a rudder control assembly according to the appended claims. The herein mentioned objects are also achieved with a method, performed by a control device, for testing a first actuator of a rudder control assembly for a missile, according to the appended claims. The herein mentioned objects are also achieved with a computer program and a computer-readable medium according to the appended claims.

According to an aspect of the invention, a rudder control assembly for a missile is provided. The rudder control assembly comprising: a first actuator connectable to a rudder, which first actuator is configured to steer the rudder when connected to the rudder; a coupling element for connecting the first actuator to the rudder; and a second actuator for locking the rudder in a fixed position, wherein the second actuator comprises a locking element, which is configured to lock and unlock the rudder and which locking element also is configured to connect the first actuator with the rudder by means of the coupling element when unlocking the rudder.

According to a further aspect of the invention, a method, performed by a control device, for testing a first actuator of a rudder control assembly for a missile is provided. The first actuator is connectable to a rudder, and which first actuator is configured to steer the rudder when connected to the rudder; the rudder control assembly comprising: a coupling element for connecting the first actuator to the rudder; and a second actuator for locking the rudder in a fixed position, wherein the second actuator comprises a locking element, which is configured to lock and unlock the rudder and which locking element also is configured to connect the first actuator with the rudder by means of the coupling element when unlocking the rudder, the method comprising: activating the first actuator to move when the rudder is locked in the fixed position, and determining if the first actuator moves when activated.

By such rudder control assembly for a missile, a rudder control assembly which is functional and reliable is achieved, and which also indicates that the steering of a rudder does not work. By such a method, a first actuator of a rudder control assembly for a missile may be tested in order to achieve a rudder control assembly which is functional and reliable, and which indicates if steering of the rudder works before launching the missile.

The invention provides a rudder control assembly and a testing method that secure the steering function of the rudder. The rudder pivots about a pivot axis when steering. When the rudder pivots in one direction about the pivot axis, the air stream that pass the rudder will exert a force on the rudder. The force acting on the rudder will steer a missile on which the rudder is arranged. When the rudder pivots in the opposite direction about the pivot axis, the rudder will steer the missile in another direction. Several rudders may be arranged on a missile in order to increase the steering ability of the missile. The rudder control assembly according to the invention, locks the rudder in a fixed position and thus prevent damages on the rudder control assembly, and also enables testing of the steering function of the rudder. The method according to the invention enables testing of the steering function of the rudder even though the rudder is locked and is not able to pivot about its pivot axis.

According to a further aspect of the invention, a missile is provided. The missile comprising the rudder control assembly disclosed herein. Such missile will be provided with rudder control assembly according to the invention, which locks the rudder in a fixed position and thus prevent damages on the rudder control assembly. The rudder control assembly arranged on the missile also enables testing of the steering function of the rudder before launching of the missile.

Additional objectives, advantages and novel features of the invention will be apparent to one skilled in the art from the following details, and through exercising the invention. While the invention is described below, it should be apparent that the invention may not be limited to the specifically described details. One skilled in the art, having access to the teachings herein, will recognize additional applications, modifications and incorporations in other areas, which are within the scope of the invention.

BRIEF DESCRIPTION OF THE FIGURES

For fuller understanding of the present disclosure and further objects and advantages of it, the detailed description set out below should be read together with the accompanying drawings, in which the same reference notations denote similar items in the various diagrams, and in which:

FIG. 4 schematically illustrates a view along line IV-IV in FIG. 3a;

FIG. 6 schematically illustrates a view along line VI-VI in FIG. 5a;

DETAILED DESCRIPTION OF VARIOUS EMBODIMENTS

Figure 1:
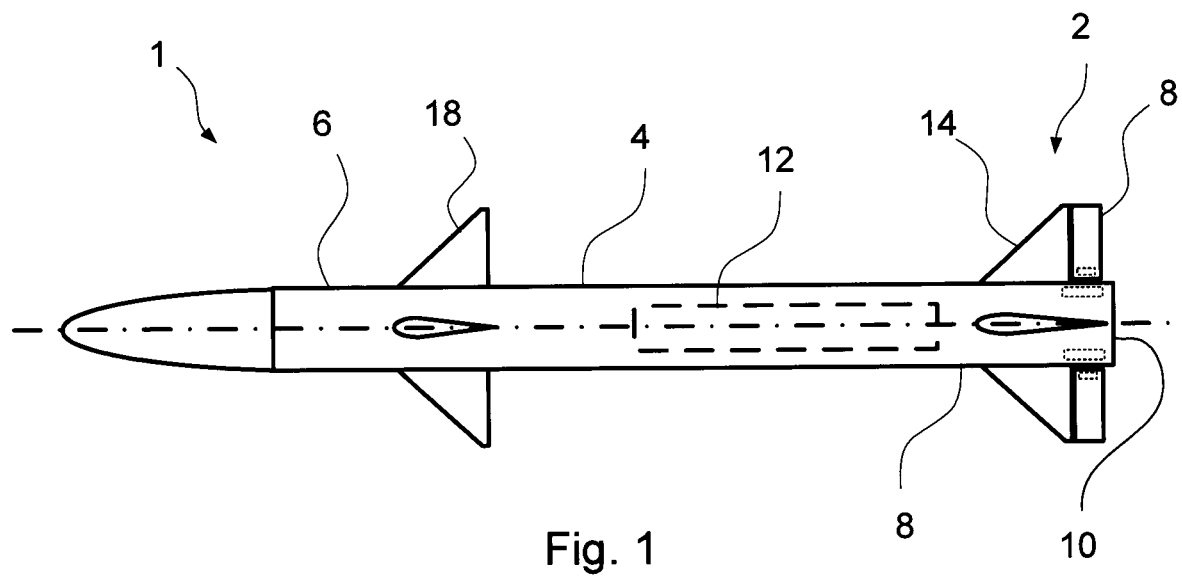
FIG. 1 schematically illustrates a side view of a missile, provided with a rudder control assembly according to an example.

The rudder control assembly according to the present disclosure may be arranged on a missile. The rudder control assembly is functional and reliable, and will also indicate if the steering of the rudder works or not. The rudder control assembly is configured to lock the rudder in a fixed position and thus prevent damages on the rudder control assembly. In the locked position, the steering function of the rudder may be tested in order to ensure functionability.

According to the present disclosure, a rudder control assembly for a missile is provided. The rudder control assembly comprising: a first actuator connectable to a rudder, which first actuator is configured to steer the rudder when connected to the rudder; a coupling element for connecting the first actuator to the rudder; and a second actuator for locking the rudder in a fixed position, wherein the second actuator comprises a locking element, which is configured to lock and unlock the rudder and which locking element also is configured to connect the first actuator with the rudder by means of the coupling element when unlocking the rudder.

The first actuator, which is connectable to the rudder, may be an electric motor. The first actuator may alternatively be a hydraulic or a pneumatic actuator. Electric power from an electric source or an electric storage unit may activate the first actuator if the first actuator is an electric motor. For steering the rudder about a pivot axis of the rudder, the first actuator should be activated. The first actuator is provided with a first actuator shaft, which is connectable to the rudder by means of the coupling element. By turning the first actuator shaft, the rudder will pivot about its pivot axis when the first actuator shaft of the first actuator is connected to the rudder by means of the coupling element. The first actuator may be disconnected from and connected to the rudder by means of the coupling element.

The second actuator is configured to lock the rudder in a fixed position and also to unlock the rudder from the fixed position. When the rudder is locked in the fixed position, the rudder has a neutral position in relation to its pivot axis. In this neutral position, the rudder will steer in a straightforward direction. The second actuator may be an electric motor. The second actuator may alternatively be a hydraulic or a pneumatic actuator. Electric power from an electric source or an electric storage unit may activate the second actuator if the second actuator is an electric motor. The second actuator may alternatively be a pyrotechnic actuator, which is activated by means of a pyrotechnic charge. When activating the second actuator, the rudder is unlocked from the fixed position and may be pivoted about the pivot axis. The locking element of the second actuator is configured to lock and unlock the rudder. The locking element is controlled by means of the second actuator. The locking element may be configured to move in an axial direction when the second actuator is activated. In the locked position of the rudder, the locking element engages the rudder and prevent the rudder to pivot about its pivot axis. When activating the second actuator the locking element moves in a direction that releases the rudder from the locked position.

The locking element of the second actuator is also configured to connect the first actuator with the rudder by means of the coupling element when unlocking the rudder. Thus, the locking element has two functions. In addition to lock and release the rudder, the locking element will also connect the first actuator with the rudder by means of the coupling element when releasing the rudder from the locked position. Connection the first actuator with the rudder may occur simultaneously as the locking element releases the rudder from the locked position. Thus, the locking element may in the same movement release the rudder from the locked position and connect the first actuator with the rudder.

According to an example, the coupling element comprises a first coupling piece arranged on the first actuator and second coupling piece arranged on the rudder.

The first coupling piece may be connected to the second coupling piece. When the two coupling pieces are connected to each other, the first actuator and the rudder are connected to each other, and the first actuator is able to steer the rudder. The first coupling piece may be disconnected from the second coupling piece. When the two coupling pieces are disconnected from each other, the first actuator and the rudder are disconnected from each other, and the first actuator is able to move without steering the rudder.

According to an example, the first and second coupling pieces have complementary shapes.

The first coupling piece, arranged on the first actuator, has a shape, which is complementary to second coupling piece, arranged on the rudder. The complementary shapes of the first and second coupling pieces will ensure a correct and reliable connection between the first and second coupling pieces, and thus a correct and reliable connection between the first actuator and the rudder. In addition, the complementary shapes of the first and second coupling pieces enable a large contact surface between the first and second coupling pieces. Further, the complementary shapes of the first and second coupling pieces enable an accurate connection between the first and second coupling pieces, which enables an accurate transmission of the movements from the first actuator to the rudder.

According to an example, the complementary shapes of the first and second coupling pieces are conically shapes.

The first coupling piece may have a conical shape which is complementary to a conical shape of the second coupling piece. The cone angle of the conical shape of the first coupling piece is thus similar to the cone angle of the conical shape of the second coupling piece. The conically complementary shapes of the first and second coupling pieces enable a large contact surface between the first and second coupling pieces. Further, the conically complementary shapes of the first and second coupling pieces enable an accurate connection between the first and second coupling pieces, which enables an accurate transmission of the movements from the first actuator to the rudder.

According to an example, the second coupling piece arranged on the rudder comprises an axially movable shaft.

The axially movable shaft is movable in its axial or longitudinal direction. The axially movable shaft may be a rod or a stick, which has elongated extension. The axially movable shaft or a part of the axially movable shaft may have a shape that is complementary to the shape of the second coupling piece. The axially movable shaft or a part of the axially movable shaft may have a conical shape that is complementary to a conical shape of the first coupling piece.

According to an example, the first coupling piece comprises a bore, which is configured to receive the axially movable shaft.

The bore or a part of the bore of the first coupling piece may have a complementary shape to the axially movable shaft. The bore, or a part of the bore may have a conical shape, which is complementary to a conically shape of the shaft or a part of the shaft, which has a conically shape.

According to an example, a spring element is arranged to axially move the axially movable shaft towards the first coupling piece.

The spring element may be a coil spring, which pushes or pulls the axially movable shaft in an axial or longitudinal direction towards the first coupling piece. When the axially movable shaft is connected to the first coupling piece, the spring force from the spring element presses the axially movable shaft in to the bore of the first coupling piece. The spring element thus ensures that the axially movable shaft is rigidly connected to the first coupling piece. Further, the spring element ensures that a rigid and accurate connection between the first and second coupling pieces is achieved, which enables an accurate transmission of the movements from the first actuator to the rudder.

According to an example, the axially movable shaft in a first axial position is configured to be locked by the locking element and disconnected from first coupling piece, and wherein the axially movable shaft in a second axial position is configured to be released by the locking element and connected to the first coupling piece.

The locking element of the second actuator locks the axially movable shaft in the first axial position and prevents the axially movable shaft to move towards the first coupling element. In the locked first axial position, the axially movable shaft is disconnected from the first coupling piece. Thus, in the first axial position of the axially movable shaft, the first actuator is disconnected from the rudder. The locking element of the second actuator is configured to connect the first actuator with the rudder by means of the coupling element when releasing the rudder from the locked position. Thus, when the axially movable shaft has been displaced to the second axial position, the axially movable shaft has been released by the locking element. In the second axial position, the axially movable shaft is connected to the first coupling piece. As the locking element releases the rudder from the locked position, the locking element may in the same movement release the axially movable shaft from the first axial position, so that the axially movable shaft moves towards the first coupling piece and connects the first axially movable shaft with the first coupling piece.

According to an example, the locking element comprises a movable pin connected to the second actuator, which movable pin is configured to be received in a recess in the axially movable shaft.

The movable pin is configured to be received in the recess in the axially movable shaft when the axially movable shaft is locked in the first axial position. A movement of the movable pin out of the recess in the axially movable shaft will release the axially movable shaft, so that the axially movable shaft is free to move towards the first coupling piece and thus connect the first actuator with the rudder. The movable pin connected to the second actuator is moved or displaced when activating the second activator.

According to an example, the locking element comprises a groove, which is configured to receive a protrusion of the axially movable shaft when the axially movable shaft is locked in the first axial position, and which protrusion is configured to leave the groove when the axially movable shaft is situated in the second axial position and connected to the first coupling piece.

The groove in the locking element and the protrusion of the axially movable shaft are together configured to relieve the movable pin from forces generated by the rudder. The groove and protrusion will ensure that the movable pin is free to move out of the recess in the axially movable shaft when unlocking the rudder and releasing the axially movable shaft. Thus, forces from the rudder will act on the protrusion of the axially movable shaft. The protrusion of the axially movable shaft will in turn act on walls of the groove. When the movable pin moves out of the recess, arranged in the axially movable shaft, the movable pin will release the axially movable shaft, so that the axially movable shaft moves towards the first coupling piece. During the axial movement of the axially movable shaft, the groove will guide the axially movable shaft in the direction towards the first coupling element. When the axially movable shaft has reached the first coupling element and is connected to the first coupling element, the protrusion of the axially movable shaft will leave the groove. When the protrusion has left the groove, the rudder is able to pivot about its pivot axis.

The rudder control assembly is adapted to be arranged on a missile. Such a missile may be suspended under a wing of an aircraft. After lunching the missile, the rudder control assembly is configured steer the missile towards a target. Several rudders may be arranged on the missile in order to increase the steering ability of the missile. Before launch of the missile and during flight of the aircraft the rudder is locked the in a fixed position by the rudder control assembly. Damages on the rudder control assembly due to aerodynamic effects are thus prevented. Before launch of the missile and also during flight of the aircraft, the steering function of the rudder may be tested. Testing of the steering function of the rudder before launch of the missile, increases the likelihood that the missile hits the target.

According to the present disclosure, a method, performed by a control device, for testing a first actuator of a rudder control assembly for a missile is provided. The first actuator is connectable to a rudder, and which first actuator is configured to steer the rudder when connected to the rudder; the rudder control assembly comprising: a coupling element for connecting the first actuator to the rudder; and a second actuator for locking the rudder in a fixed position, wherein the second actuator comprises a locking element, which is configured to lock and unlock the rudder and which locking element also is configured to connect the first actuator with the rudder by means of the coupling element when unlocking the rudder, the method comprising: activating the first actuator to move when the rudder is locked in the fixed position, and determining if the first actuator moves when activated.

The method enables the function of the steering function of the first actuator to be tested even though the rudder is fixed and cannot move. The control device is connected to the first and second actuators. An energy storage unit, such as an electric battery, is connected to the control device and provides the control device, and the first and second actuators with power. The energy storage unit may alternatively be connected directly to the first and second actuators. Testing the first actuator of the rudder control assembly means results in that the functionality of the steering ability of the rudder of the control assembly means is tested. Testing the first actuator of the rudder control assembly means starts by activating the first actuator to move when the rudder is locked in the fixed position. A test signal from the control device is sent to the first actuator. The test signal will turn the first shaft of the first actuator some degrees about its centre axis in one direction or in both directions.

The first shaft of the first actuator may in a version be provided with a stop arrangement, which defines the end position of the turning motion of the first shaft during the test operation. The stop arrangement may comprise a diametrically arranged hole in the first shaft and a bolt, which extends through the diametrically arranged hole in the first shaft. The hole has a diameter, which is larger than the diameter of the bolt, so that the first shaft is allowed to turn some degrees before the end parts of the diametrically arranged hole in the first shaft abuts the bolt. Thus, during the test operation of the first actuator, the first shaft of the first actuator may be turned in one direction or both directions until the end parts of the diametrically arranged hole in the first shaft abuts the bolt.

During turning of the first shaft of the first actuator, or after the turning of the first shaft of the first actuator has been performed, it is determined by means of the control device if the first actuator moves when activated or has been moved during the activation. If the first actuator moves during the test operation, the first actuator is working and the rudder will be steerable when unlocked. However, the first actuator is not working if the first actuator has not moved during the test operation.

According to an example, the second actuator is activated for unlocking the rudder, if it is determined that first actuator moves when activated.

If the first actuator moves during the test operation, the first actuator is working and the rudder will be steerable when unlocked. Thus, the second actuator may be activated by sending a signal from the control device to the second actuator to unlock the rudder.

The present disclosure also relates to a computer program comprising instructions which, when the program is executed by a computer, causes the computer to carry out the method disclosed above. The invention further relates to a computer-readable medium comprising instructions, which when executed by a computer causes the computer to carry out the method disclosed above.

The present disclosure will now be further illustrated with reference to the appended figures.

FIG. 1 schematically illustrates a side view of a missile 1, provided with a rudder control assembly 2 according to an example. The missile 1 comprises an elongated body 4, with a front part 6 and an rear part 8. The end part 8 comprises an opening 10 for an engine 12, such as a jet engine or a rocket engine. The missile 1 comprises fins 14 and rudders 16. There are guide fins 18 in the front part 6 of the missile 1, which guide fins 18 are fixed to the body 4. However, the guide fins 18 may alternatively be steerable. At the rear part 8 of the missile 1, fins 14 are arranged, which are provided with steerable rudders 16. Several fins 14 and rudders 16 may be arranged on the missile 1 in order to increase the steering ability of the missile 1. Each rudder 16 is provided with a rudder control assembly 2 according to the present disclosure. The rudder control assembly 2 comprises components, which are arranged at the rudder 16 and within the body 4 of the missile 1.

Figure 2:
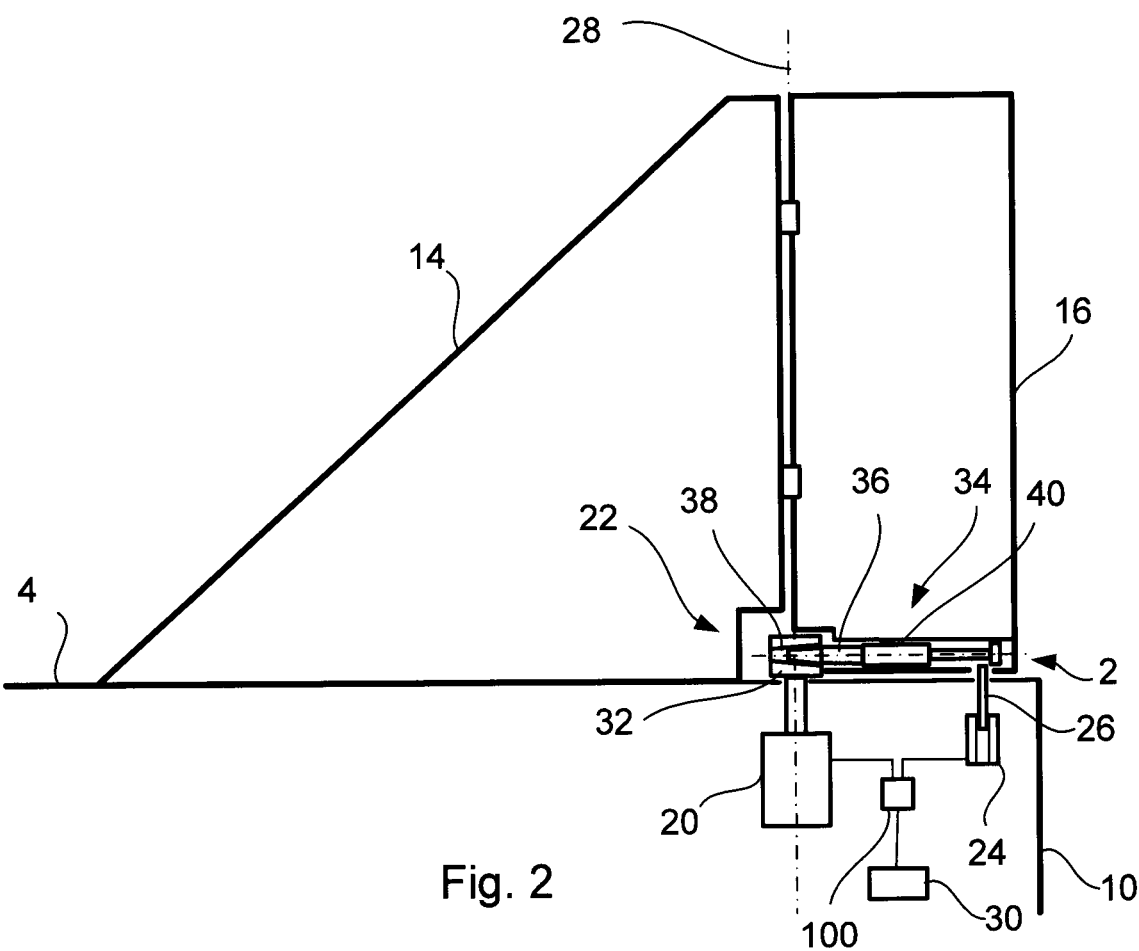
FIG. 2 schematically illustrates a view in perspective of a side view of a rudder control assembly according to an example.

FIG. 2 schematically illustrates a view in perspective of a side view of a rudder control assembly 2 according to an example. The rudder control assembly 2 comprising a first actuator 20 connectable to a rudder 16. The rudder 16 is pivotally arranged at a fixed fin 14. However the fin 14 and rudder 16 may be an integrated part, so that the fin 14 is pilotable. The first actuator 20 is configured to steer the rudder 16 when connected to the rudder 16. A coupling element 22 is provided for connecting the first actuator 20 to the rudder 14. A second actuator 24 is provided for locking the rudder 16 in a fixed position. The second actuator 24 comprises a locking element 26, which is configured to lock and unlock the rudder 16. The locking element 26 also is configured to connect the first actuator 20 with the rudder 16 by means of the coupling element 22 when unlocking the rudder 16. The rudder 16 is pivotally arranged about a pivot axis 28 when steering. A control device 100 is connected to the first and second actuators 20, 24. An energy storage unit 30, such as an electric battery, is connected to the control device 100 and provides the control device 100, and the first and second actuators 20, 24 with power.

Figure 3A:
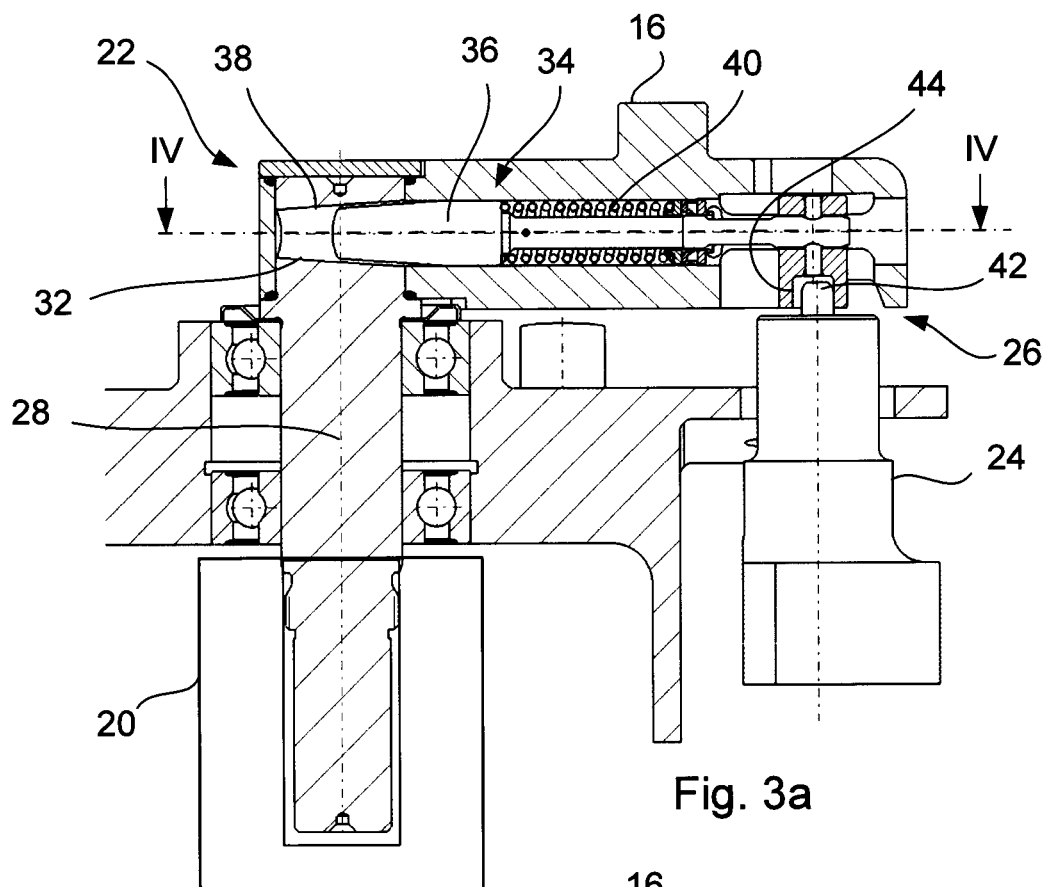
FIGS. 3a and 3b schematically illustrate section views of a rudder control assembly according to an example in a locked position and in an unlocked position.
Figure 3B:
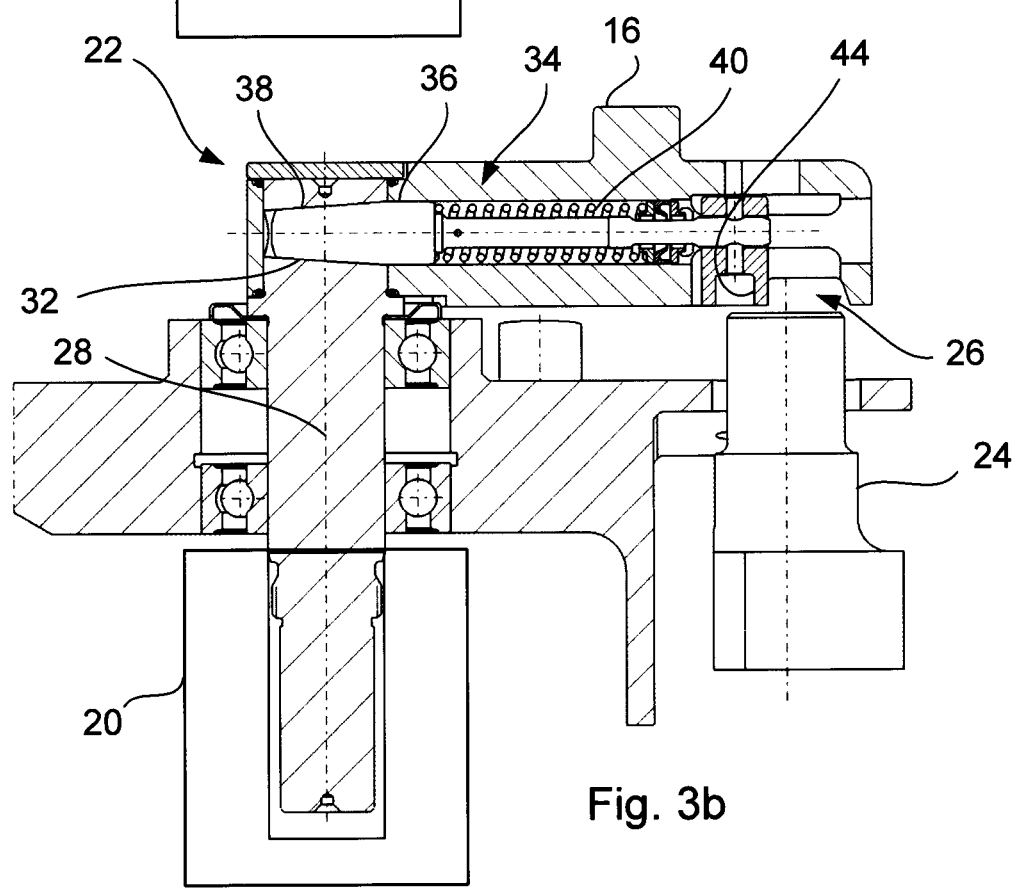

FIGS. 3a and 3b schematically illustrate section views of a rudder control assembly 2 according to an example in a locked position and in an unlocked position. The coupling element 22 comprises a first coupling piece 32 arranged on the first actuator 20 and second coupling piece 34 arranged on the rudder 16. The first and second coupling pieces 32, 34 have complementary shapes, which are conically shapes.

The second coupling piece 34 arranged on the rudder 16 comprises an axially movable shaft 36. The first coupling piece 32 comprises a conically bore 38, which is configured to receive the axially movable shaft 36. A spring element 40 is arranged to axially move the axially movable shaft 36 towards the first coupling piece 32. The axially movable shaft 36 is in a first axial position, disclosed in FIG. 3a, configured to be locked by the locking element 26 and disconnected from first coupling piece 32. The axially movable shaft 36 is in a second axial position, disclosed in FIG. 3b, configured to be released by the locking element 26 and connected to the first coupling piece 32. The locking element 26 comprises a movable pin 42 connected to the second actuator 24, which movable pin 42 is configured to be received in a recess 44 in the axially movable shaft 36.

Figure 4:
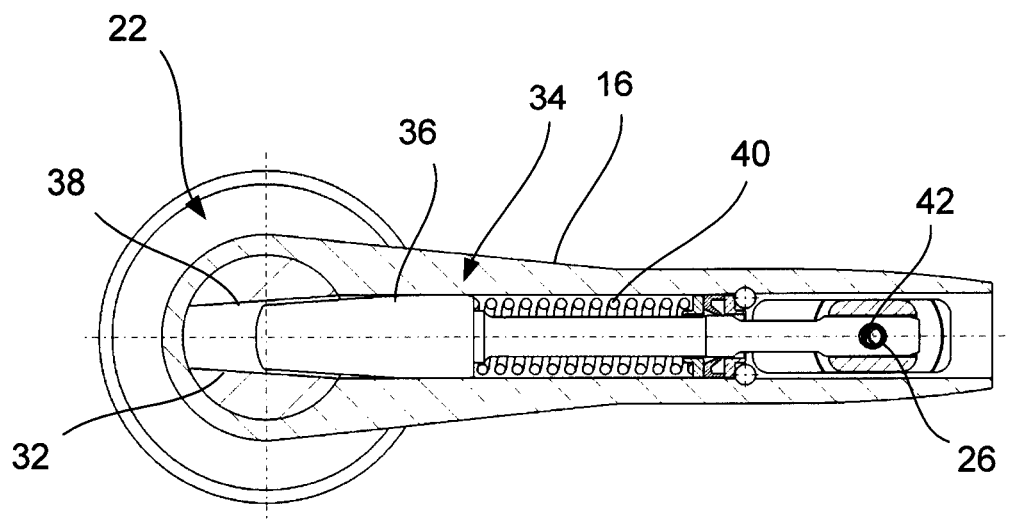

FIG. 4 schematically illustrates a view along line IV-IV in FIG. 3a. The axially movable shaft 36 is arranged in the rudder 16. The spring element 40 is arranged to axially move the axially movable shaft 36 towards the first coupling piece 32. The axially movable shaft 36 is in the first axial position, disclosed in FIG. 4, configured to be locked by the locking element 26 and disconnected from first coupling piece 32.

Figure 5A:
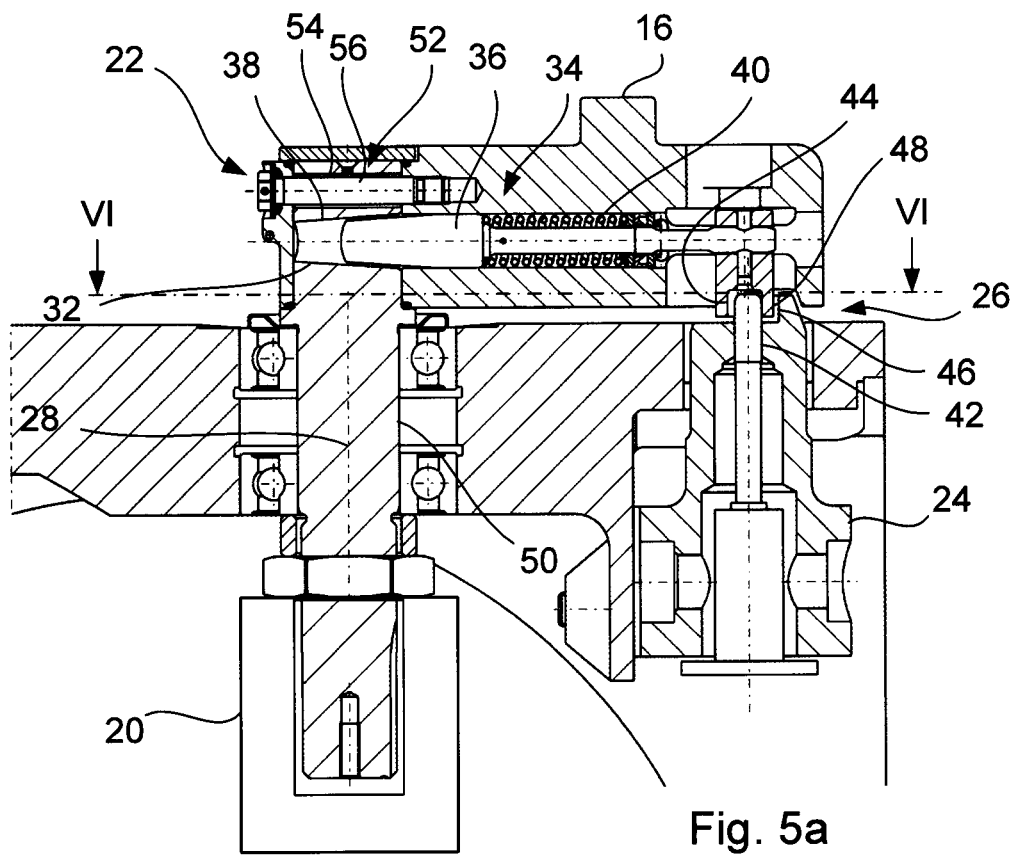
FIGS. 5a and 5b schematically illustrate section views of a rudder control assembly according to an example in a locked position and in an unlocked position.
Figure 5B:
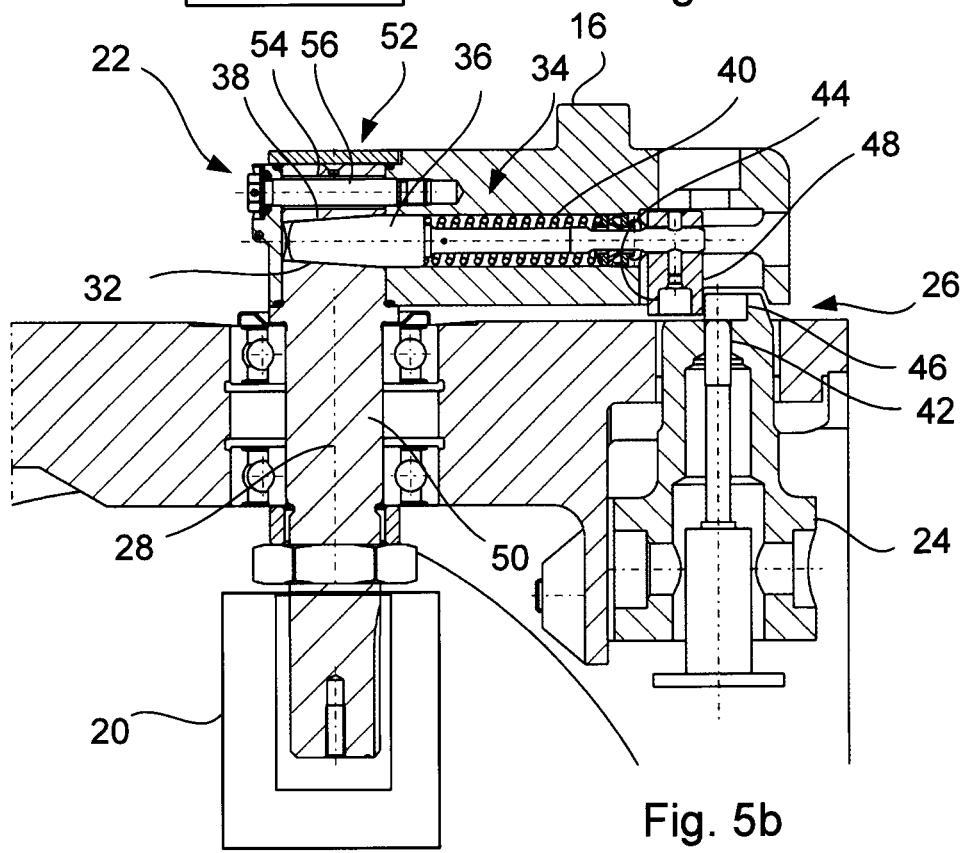

FIGS. 5a and 5b schematically illustrate section views of a rudder control assembly 2 according to an example in a locked position and in an unlocked position. The locking element 26 comprises a groove 46, which is configured to receive a protrusion 48 of the axially movable shaft 36 when the axially movable shaft 36 is locked in the first axial position disclosed in FIG. 5a. The protrusion 48 is configured to leave the groove 46 when the axially movable shaft 36 is situated in the second axial position and connected to the first coupling piece 32, disclosed in FIG. 5b. A first shaft 50 of the first actuator 20 is provided with a stop arrangement 52, which defines the end position of the turning motion of the first shaft 50 during the test operation. The stop arrangement 50 comprises a diametrically arranged hole 54 in the first shaft 50 and a bolt 56, which extends through the diametrically arranged hole 54 in the first shaft 50. The hole 54 has a diameter, which is larger than the diameter of the bolt 56, so that the first shaft 50 is allowed to turn some degrees before the end parts of the diametrically arranged hole 54 in the first shaft 50 abuts the bolt 56.

Figure 6:
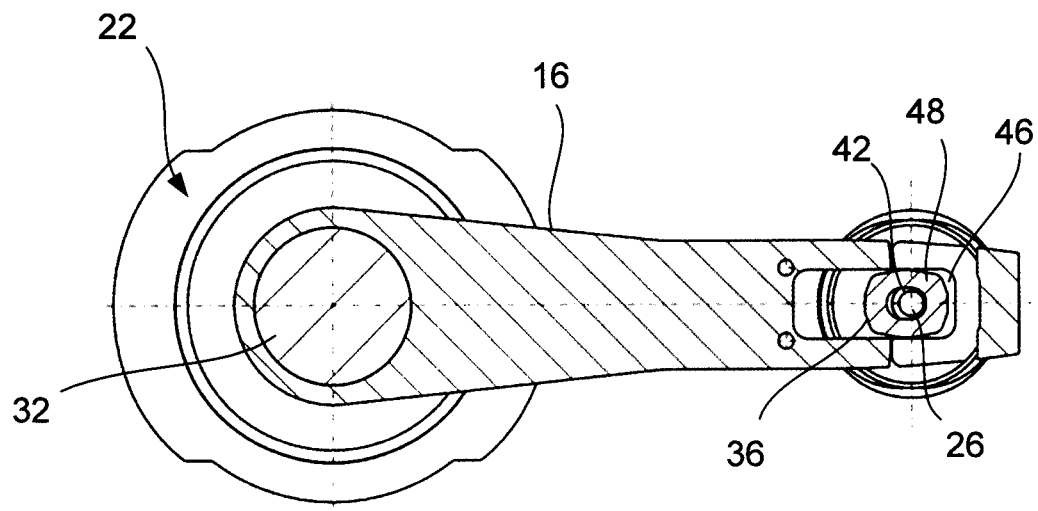

FIG. 6 schematically illustrates a view along line VI-VI in FIG. 5a. The axially movable shaft 36 is situated in the first axial position, disclosed in FIG. 6, configured to be locked by the locking element 26 and disconnected from first coupling piece 32. The groove 46 is configured to receive the protrusion 48 of the axially movable shaft 36 when the axially movable shaft 36 is locked in the first axial position. The protrusion 48 of the axially movable shaft 36 is movable in the rudder 16.

Figure 7:
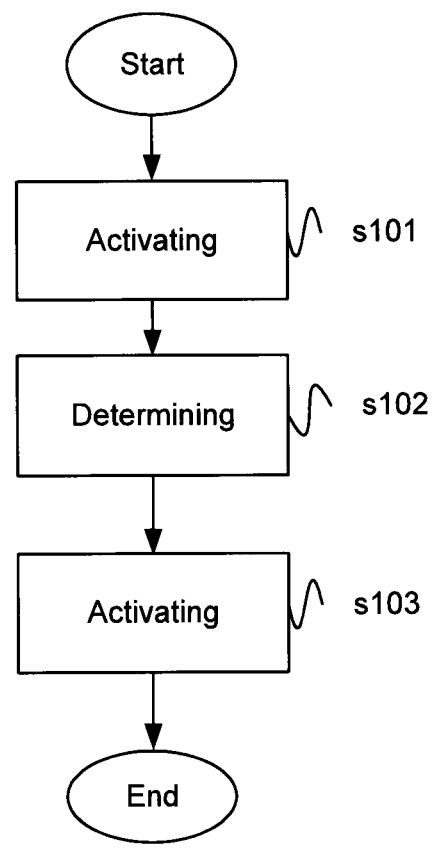
FIG. 7 illustrates a flow chart for a method, performed by a control device for testing a first actuator of a rudder control assembly for a missile according to an example.

FIG. 7 illustrates a flow chart for a method, performed by a control device 100 for testing a first actuator 20 of a rudder control assembly 2 for a missile 1 according to an example. The method thus relates to the testing of the first actuator 20 of the rudder control assembly 2 for a missile 1 disclosed in FIGS. 1-6. The rudder control assembly 2 comprising a first actuator 20 connectable to a rudder 16, and which first actuator 20 is configured to steer the rudder 16 when connected to the rudder 16; the rudder control assembly 2 comprising: a coupling element 22 for connecting the first actuator 20 to the rudder 16; and a second actuator 24 for locking the rudder 16 in a fixed position, wherein the second actuator 24 comprises a locking element 26, which is configured to lock and unlock the rudder 16 and which locking element 26 also is configured to connect the first actuator 20 with the rudder 16 by means of the coupling element 22 when unlocking the rudder 16.

The method comprising: activating s101 the first actuator 20 to move when the rudder 16 is locked in the fixed position, and determining s102 if the first actuator 20 moves when activated.

According to an aspect, the second actuator 24 is activated for unlocking the rudder 16, if it is determined that first actuator 20 moves when activated.

Figure 8:
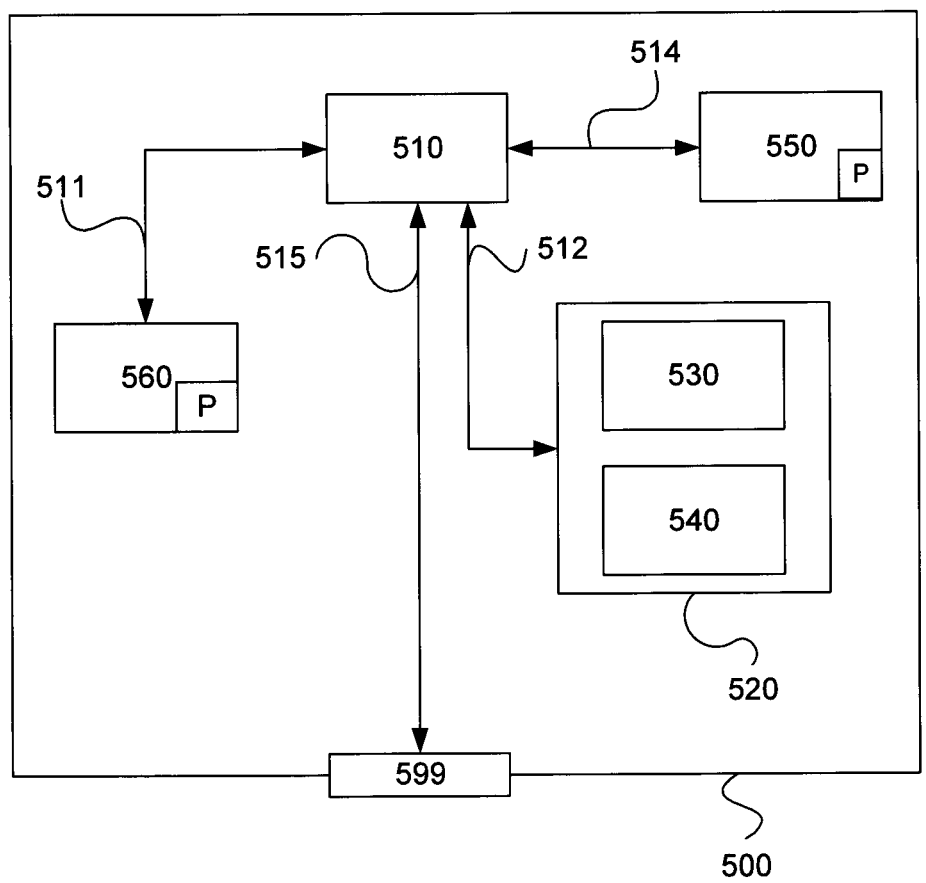
FIG. 8 schematically illustrates a computer or a device according to an example.

FIG. 8 schematically illustrates a computer or a device 500 according to an example. The control device 100 of the rudder control assembly may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer programme P which comprises routines for performing the safety method. The programme P may be stored in an executable form or in a compressed form in a memory 560 and/or in a read/write memory 550.

Where the data processing unit 510 is described as performing a certain function, it means that the data processing unit 510 effects a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the programme stored in the memory 560 or the read/write memory 550. When the device 500 runs the programme, methods herein described are executed.

The foregoing description of the examples has been furnished for illustrative and descriptive purposes. It is not intended to be exhaustive, or to limit the examples to the variants described. Many modifications and variations will obviously be apparent to one skilled in the art. The examples have been chosen and described in order to best explicate principles and practical applications, and to thereby enable one skilled in the art to understand the examples in terms of its various examples and with the various modifications that are applicable to its intended use. The components and features specified above may, within the framework of the examples, be combined between different examples specified.

The invention claimed is:

1. A rudder control assembly (2) for a missile (1), the rudder control assembly (2) comprising:

a first actuator (20) connectable to a rudder (16), which first actuator (20) is configured to steer the rudder (16) when connected to the rudder (16);

a coupling element (22) for connecting the first actuator (20) to the rudder (16); and a second actuator (24) for locking the rudder (16) in a fixed position, wherein the second actuator (24) comprises a locking element (26), which is configured to lock and unlock the rudder (16) and which locking element (26) also is configured to connect the first actuator (20) with the rudder (16) by means of the coupling element (22) when unlocking the rudder (16).

2. The rudder control assembly (2) according to claim 1, wherein the coupling element (22) comprises a first coupling piece (32) arranged on the first actuator (20) and second coupling piece (34) arranged on the rudder (16).

3. The rudder control assembly (2) according to claim 2, wherein the first and second coupling pieces (32, 34) have complementary shapes.

4. The rudder control assembly (2) according to claim 3, wherein the complementary shapes of the first and second coupling pieces (32, 34) are conically shapes.

5. The rudder control assembly (2) according to claim 2, wherein the second coupling piece (34) arranged on the rudder (16) comprises an axially movable shaft (36).

6. The rudder control assembly (2) according to claim 5, wherein the first coupling piece (32) comprises a bore (38), which is configured to receive the axially movable shaft (36).

7. The rudder control assembly (2) according to claim 5, wherein a spring element (40) is arranged to axially move the axially movable shaft (36) towards the first coupling piece (32).

8. The rudder control assembly (2) according to claim 5, wherein:

the axially movable shaft (36) in a first axial position is configured to be locked by the locking element (26) and disconnected from first coupling piece (32), and the axially movable shaft (36) in a second axial position is configured to be released by the locking element (26) and connected to the first coupling piece (32).

9. The rudder control assembly (2) according to claim 8, wherein the locking element (26) comprises a movable pin (42) connected to the second actuator (24), which movable pin (42) is configured to be received in a recess (44) in the axially movable shaft (36).

10. The rudder control assembly (2) according to claim 9, wherein the locking element (26) comprises a groove (46), which is configured to receive a protrusion (48) of the axially movable shaft (36) when the axially movable shaft (36) is locked in the first axial position, and which protrusion (48) is configured to leave the groove (46) when the axially movable shaft (36) is situated in the second axial position and connected to the first coupling piece (32).

11. A missile (1), comprising a rudder control assembly (2) according to claim 1.

12. A method, performed by a control device (100), for testing a first actuator (20) of a rudder control assembly (2) for a missile (1), which first actuator (20) is connectable to a rudder (16), and which first actuator (20) is configured to steer the rudder (16) when connected to the rudder (16); the rudder control assembly (2) comprising: a coupling element (22) for connecting the first actuator (20) to the rudder (16); and a second actuator (24) for locking the rudder (16) in a fixed position, wherein the second actuator (24) comprises a locking element (26), which is configured to lock and unlock the rudder (16) and which locking element (26) also is configured to connect the first actuator (20) with the rudder (16) by means of the coupling element (22) when unlocking the rudder (16), the method comprising:

activating (s101) the first actuator (20) to move when the rudder (16) is locked in the fixed position, and determining (s102) if the first actuator (20) moves when activated.

13. The method according to claim 12, wherein the method further comprises activating (s103) the second actuator (24) for unlocking the rudder (16), if it is determined that first actuator (20) moves when activated.

14. A computer program (P) comprising instructions which, when the program (P) is executed by a computer (100; 500), cause the computer (100; 500) to carry out the method according to claim 12.

15. A non-transitory computer-readable medium comprising instructions, which when executed by a computer (100; 500), cause the computer (100; 500) to carry out the method according to claim 12.

* * * * *